(No Model.)
J. PATTEN.
SCREW BOLT.
No. 328,139.
2 Sheets—Sheet 1.
Patented Oct. 13, 1885.
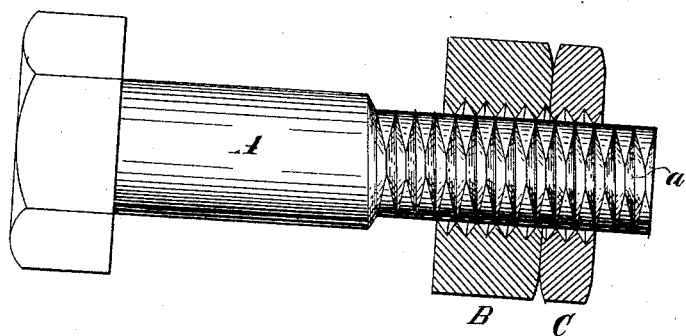
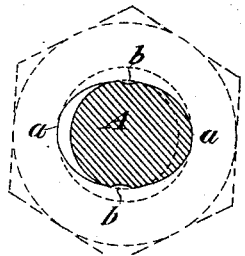
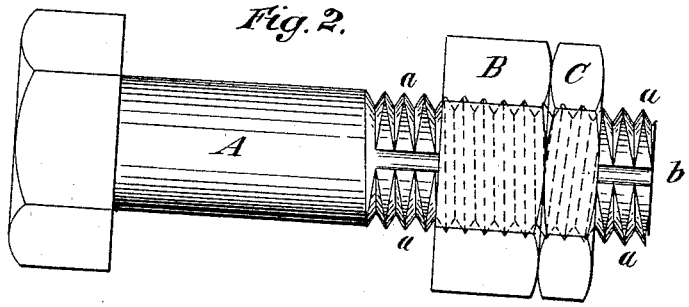
Witnesses
Inventor
Jefferson Patten,
by his attorneys
Gifford & Brown (No Model.) 2 Sheets—Sheet 2.
J. PATTEN.
SCREW BOLT.
No. 328,139. Patented Oct. 13, 1885.
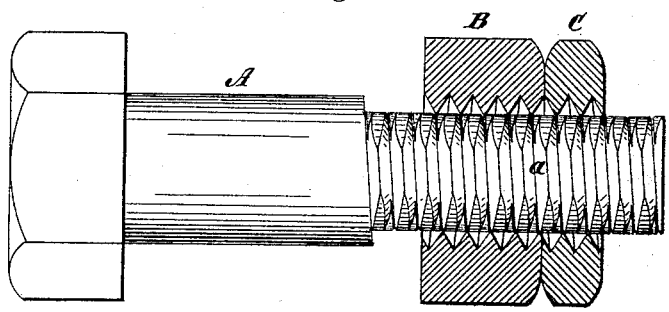
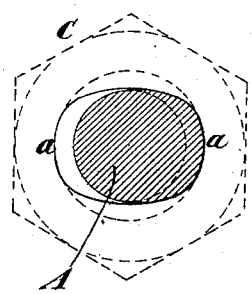
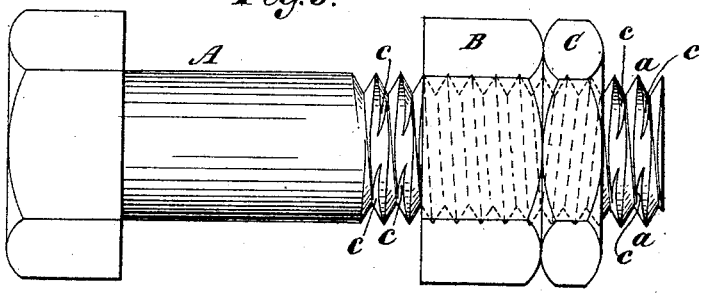

United States Patent Office.

JEFFERSON PATTEN, OF BROOKLYN, ASSIGNOR, BY MESNE ASSIGNMENTS, TO THE TUBAL CAIN TAP, DIE, AND BOLT COMPANY, OF NEW YORK, N. Y.

SCREW-BOLT.

SPECIFICATION forming part of Letters Patent No. 328,139, dated October 13, 1885.

Application filed April 4, 1884. Serial No. 126,626. (No model.)

*To all whom it may concern:*

Be it known that I, JEFFERSON PATTEN, of Brooklyn, in Kings county and the State of New York, have invented a certain new and useful Improvement in Bolts and Nuts, of which the following is a specification.

My improvement relates to the class of bolts and nuts where two nuts have been adapted to be turned in reverse directions to screw them upon a single bolt. Heretofore this result has been attained in two different ways. One way has been to make the bolt at different portions of its length of different sizes diametrically, and to provide these different portions with reversely-inclined screw-threads, so as to adapt them for nuts made internally of sizes corresponding to them and furnished with threads adapted to engage with them. This way is objectionable, because, owing to the fact that the nuts need to be located at the junction of the two different-sized portions of the bolt, less range in the adjustment of the nuts is afforded than is desirable. The other way has been to form two reversely-inclined threads upon one and the same portion of the bolt. This latter way is objectionable because of the difficulty of properly forming the threads, and, moreover, because the intersection of the threads entails the removal of so much of each thread as to materially weaken it.

The object of my improvement is to produce a bolt and nuts of such character that the nuts may be turned in reverse directions to screw them on the bolt without forming the bolt with reversely-threaded portions of different diameters or with reversed intersecting threads.

My improvement consists in a bolt or nut provided with a single screw-thread having a full projection at opposite portions and a gradually less projection toward intermediate portions of the bolt or nut, the operative portions of the thread being of such length circumferentially of the bolt or nut that either a nut or bolt having a right-hand or a left-hand thread may be used in conjunction therewith. It will be advantageous to chamfer off the extremities of the operative portions of the thread of my bolt or nut, so as to there enlarge the space between the operative portions of the screw-thread.

In the accompanying drawings, Figure 1 is a side view of a bolt embodying my improvement and a transverse section of two nuts fitted thereto. Fig. 2 is a side view both of the bolt and nuts, the screw-threads of the nuts being shown by dotted lines. Fig. 3 is a transverse section of the screw-threaded end of the bolt and an end view of a nut delineated by dotted lines. Fig. 4 is a side view of another bolt embodying my improvement and a transverse section of two nuts fitted thereto. Fig. 5 is a side view of the bolt and the nuts which are shown in Fig. 4, the screw-threads of the nuts being delineated by dotted lines. Fig. 6 is a transverse section of the screw-threaded end of the bolt shown in Figs. 4 and 5, and a similar view of a nut applied thereto, the latter being shown by dotted lines.

Similar letters of reference designate corresponding parts in all the figures.

I will first describe my improvement as it is illustrated in Figs. 1, 2, and 3.

A designates the bolt, and B C designate the nuts which are used therewith. The bolt A has a single screw-thread, which extends in the same direction around the body of the bolt. At opposite portions or sides *a* of the bolt this screw-thread is of full projection, but it is of gradually less projection from these portions toward the intermediate portions of the bolt. As here shown, it decreases in projection toward the portions intermediate of the portions *a*, so that plain spaces *b* are left on the body of the bolt.

The operative portions of the screw-thread are made of such length circumferentially of the bolt that the nut B, having a right-hand screw-thread, and also the nut C, provided with a left-hand screw-thread, can be engaged therewith.

Turning now to a consideration of my improvement, as illustrated by Figs. 4, 5, and 6, it will be seen that the screw-thread does not entirely disappear at the portions of the bolt intermediate of the portions *a*, where it is of full projection. It will also be observed that the sides of the screw-thread are chamfered off at certain parts, *c*. These chamfered parts are at about the ends of the operative portions of the thread, and they there widen the space between the adjacent convolutions of the threads, so as to facilitate the operation of the screw-threads B C with the screw-thread of the bolt.

The screw-threads of the nuts B C may be the ordinary kind. I may provide the nuts or a nut with the peculiar thread which I have described in conjunction with my bolt, and then use with such nut a bolt having an ordinary right or left hand screw-thread.

What I claim as my invention, and desire to secure by Letters Patent, is—

1. A bolt or nut provided with a single screw-thread having a full projection at opposite portions and a gradually less projection toward intermediate portions of the bolt or nut, the operative portions of the thread being of such length circumferentially of the bolt or nut that either a nut or bolt having a right-hand or a left-hand screw-thread may be used in conjunction therewith, substantially as specified.

2. A bolt or nut provided with a single screw-thread having a full projection at opposite portions and a gradually less projection toward the intermediate portions of the bolt or nut, the operative portions of the thread being of such length circumferentially of the bolt or nut that a nut or bolt having a right-hand or a left-hand screw-thread may be used in conjunction therewith, and said operative portions being chamfered off at the ends to there enlarge the space between adjacent convolutions of the screw-thread, substantially as specified.

JEFFERSON PATTEN.

Witnesses:
T. J. KEANE,
E. T. ROCHE.